United States Patent
Spork (10) Patent No.: US 11,117,302 B2
(45) Date of Patent: Sep. 14, 2021

(54) DIAGNOSIS SYSTEM AND METHOD FOR TEMPERING DEVICES

(71) Applicant: Single Holding GmbH, Hochdorf (DE)

(72) Inventor: Frank Spork, Hochdorf (DE)

(73) Assignee: Single Holding GmbH, Hochdorf (DE)

( * ) Notice: Subject to any disclaimer, the term of this patent is extended or adjusted under 35 U.S.C. 154(b) by 81 days.

(21) Appl. No.: 16/599,670

(22) Filed: Oct. 11, 2019

(65) Prior Publication Data

US 2020/0114562 A1  Apr. 16, 2020

(30) Foreign Application Priority Data

Oct. 12, 2018  (DE) .................. 10 2018 125 256.0

(51) Int. Cl.
*B29C 45/78* (2006.01)
*B29C 45/73* (2006.01)
(Continued)

(52) U.S. Cl.
CPC .......... *B29C 45/78* (2013.01); *B29C 45/7306* (2013.01); *G01K 13/00* (2013.01);
(Continued)

(58) Field of Classification Search
CPC ............... B29C 45/78; B29C 45/7306; B29C 2945/7604; B29C 2945/76454;
(Continued)

(56) References Cited

U.S. PATENT DOCUMENTS 5,954,265 A  9/1999  Hall et al.
6,996,997 B2 *  2/2006  Wiff .................. F25D 29/003
                                                       62/127
(Continued)

FOREIGN PATENT DOCUMENTS

DE          69224616 T2    7/1998
DE       102004010384 A1   9/2004
DE       102008027039 A1  12/2009

OTHER PUBLICATIONS

German Office Action dated May 23, 2019 of application No. DE 10 2018 125 256.0.

*Primary Examiner* — Nathaniel T Woodward
(74) *Attorney, Agent, or Firm* — Jones Day (57) ABSTRACT

A diagnosis method for identification or localization of errors in tempering devices for tempering of systems includes providing tempering devices each comprising one or more first sensors and one or more components for securing an operation of the systems with the tempering device, and one or more second sensors for measuring a state of the tempering device or ambient conditions around the tempering device, determining the tempering device to be checked with a diagnosis procedure, decoupling the tempering device from the system, connecting the tempering device to a defined consumer, and conducting the diagnosis procedure for the tempering device by using a diagnosis program, where the diagnosis program checks the components and the first and second sensors of the tempering device in a pre-determined sequence stored in the diagnosis program until the error in the tempering device is identified or localized.

18 Claims, 3 Drawing Sheets

(51) Int. Cl.
*G01K 13/00* (2021.01)
*G01K 15/00* (2006.01)
*G01L 19/00* (2006.01)
*G01L 27/00* (2006.01)

(52) U.S. Cl.
CPC ........ *G01K 15/005* (2013.01); *G01L 19/0092* (2013.01); *G01L 27/005* (2013.01); *B29C 2945/7604* (2013.01); *B29C 2945/76454* (2013.01); *B29C 2945/76531* (2013.01)

(58) Field of Classification Search
CPC .......... B29C 2945/76531; B29C 45/76; B29C 48/92; B29C 2945/76006; B29C 2948/92019; B29C 2948/92209; G01K 13/00; G01K 15/005; G01L 19/0092; G01L 27/005; G05B 23/0205; G01D 21/02
USPC ......................................................... 702/98
See application file for complete search history.

(56) References Cited

U.S. PATENT DOCUMENTS

| | | | |
|---|---|---|---|
| 8,090,557 B2 * | 1/2012 | Koch | ................. G05B 19/4097 703/1 |
| 2004/0035194 A1 | 2/2004 | Wakahara | |

\* cited by examiner

DIAGNOSIS SYSTEM AND METHOD FOR TEMPERING DEVICES

CROSS-REFERENCE TO RELATED APPLICATIONS

This application claims foreign priority to German Patent Application No. DE 10 2018 125 256, filed Oct. 12, 2018, which is hereby incorporated by reference in its entirety for all purposes.

BACKGROUND

1. Field of the Invention

The present disclosure relates to a diagnosis method for tempering devices for tempering of systems for identification and/or localization of errors in the tempering devices, and such a tempering device for execution of such a diagnosis method.

2. Related Art

Tempering systems or tempering devices are used in order to provide the temperature of machines, media or substances in systems and/or processes required for the successful execution of activities or processes and/or to control these in the manner appropriate for the process. One exemplary area of use for tempering appliances is the plastic processing industry, in particular the injection molding sector. Controlled tool temperatures are necessary at all times in order to produce consistently high-quality parts. To this extent, a tempering device is a core component of the overall process in such a process. A faulty tempering system can halt the entire production process and lead to high standstill costs. These standstill costs can even increase further if the tempering appliance is replaced by a functioning reserve appliance, and instead has to be repaired by a service technician, who may not be available immediately locally for operations on site overseas. While having replacement appliances in storage may rectify these additional problems, it involves additional financial cost due to the presence of replacement appliances.

A tempering appliance with a flow measurement is known from DE 10 2008 027 039 A1.

The known tempering appliance is fitted with a pump for transporting a tempering medium, a pressure measurement apparatus downstream from the pump, a blocking apparatus downstream from the pump and a control and evaluation unit, wherein in the control and evaluation unit, a pump characteristic curve of the pump of the tempering appliance is stored, which shows a ratio between a pump pressure of the tempering appliance and a flow quantity of the tempering medium, and the control and evaluation unit is designed such that the pump characteristic curve is calibratable.

It would therefore be desirable if the availability of the appliance for the tempering devices at the customer could also be maintained in case of fault in a tempering device, also for areas with no immediate availability of service technicians, without a stock of replacement appliances having to be kept in storage.

SUMMARY

In an aspect, A diagnosis method for identification or localization of errors in tempering devices for tempering of systems, includes: providing tempering devices each including one or more first sensors and one or more components for securing an operation of the systems with the tempering device, and one or more second sensors for measuring a state of the tempering device or ambient conditions around the tempering device, determining the tempering device that is to be checked with a diagnosis procedure, decoupling the tempering device from the system, connecting the tempering device to a defined consumer, and conducting the diagnosis procedure for the tempering device by means of a diagnosis program, wherein the diagnosis program checks the components and the first and second sensors of the tempering device in a pre-determined sequence stored in the diagnosis program, until the error in the tempering device is identified and/or localized.

Tempering devices can for example be devices through which the medium to be tempered passes, wherein the medium is tempered in the tempering device. Such a medium can be for example water or an oil. The tempering devices comprise for example a hydraulic circuit, can be designed with or without a network connection. The tempering devices can be used, for example, for production and test processes, such as injection molding tools, extruders or other applications. Components of the tempering device here denote all subsystems in the tempering device provided for the operation of the tempering device, such as motors, aggregates, valves, switches or their electrical supply, etc.

With the tempering devices, poor ambient conditions and/or poor appliance or component conditions and/or wear can lead to failures. Through the use of second sensors for determining the appliance state in addition to the first sensors, the measurement density in the appliance is increased, as a result of which conclusions can be reached regarding an error source faster and more clearly, and thus the error can be rectified considerably faster than if only the usual first sensors required for the process are present in the tempering device. Here, the sensors for measuring the ambient conditions around the tempering device are usually installed in the tempering device. However, second sensors can also be disposed outside the tempering device and connected to it via data lines. Here, sensors can be used only as first sensors and other sensors can be used only as second sensors. In an alternative embodiment, however, one or more of the sensors can also assume the function of the first sensors as well as the function of the second sensors; if appropriate, these functions can also be simultaneously executed by the corresponding sensor.

Not all errors in the ambient conditions and on the tempering device can be unequivocally determined during ongoing operation. A more precise localization through measurement and observation during ongoing operation is not always possible, so that usually, several possible error sources remain. In order to give an operator or service technician who is not specifically trained to handle the tempering device the opportunity of precisely identifying faults that occur during operation and to initiate countermeasures, the diagnosis procedure was developed. This also serves to evaluate the capacity of the tempering device compared to its state on delivery.

The diagnosis procedure is intended to precisely localize and identify the fault if a fault occurs. The diagnosis procedure is conducted on site at the tempering device without special knowledge regarding the tempering device being required. The rapid error search that this enables increases the availability of the tempering device in the system, the so-called up time at the customer, since rapidly identified and localized errors can be rectified more quickly and as a result, the tempering device can again be made available for the tempering process faster. This is particularly important for small- or medium-sized customers, since their staff on site do not usually have detailed knowledge about the tempering technique. As a result, the commissioning of several service technicians for rectifying errors can in part be avoided, which in the case of tempering systems sold globally in particular offers a major time advantage for the customer and also increases appliance availability. The decoupling of the tempering device from the system (consumer) excludes the influences of the consumer on the measurements, e.g. with low-level leaks, where it is not clear whether they are caused by the system or whether they are located in the tempering device. Following connection to a defined consumer, the tempering device can be tested in the same way as for operating in the system during ongoing operation, wherein all error observations can now be traced solely back to the tempering device. With the second sensors, pressures, flows, temperatures, binary states of switches and valves and if appropriate, other parameters in the tempering device can be measured, the measurement values of which are not accessible via the first sensors alone. Due to the separation of the tempering device from the process and the resulting exclusion of process-related influences, it is possible, together with the diagnosis procedure and the second sensors used specifically to find the error, to identify clearly up to 90% or even more of the hydraulic errors. For this purpose, the diagnosis procedure also measures the state of the tempering device against corresponding reference values in the delivery state, which are for example stored in a diagnosis unit for executing the diagnosis program in the respective tempering device.

The method may also make it possible to maintain appliance availability for the tempering devices at the customer also for areas where service technicians are not immediately available, without having to keep a stock of replacement appliances in storage.

In one example, the step of conducting the diagnosis procedure comprises the additional step of checking and/or calibrating at least the second sensors for their correct functioning. The function test of the sensors and their calibration prior to executing the diagnosis procedure improves the quality of the measurements during the diagnosis procedure and thus the reliability and quality of the results of the diagnosis procedure. Therefore, in one preferred embodiment, only after checking and calibration has been completed it is conducted a measurement of measurement values at least with the second sensors in order to assess a state of the components of the tempering device.

In a further example, the above steps, in particular calibration, are also conducted for the first sensors. Since errors can also originate from an incorrect function of the first sensors, the involvement of the first sensors and the inspection, calibration and generation of measurement values improves the effectiveness of the diagnosis procedure for localization and identification of errors in the tempering device, which hamper or prevent correct operation.

In a further example, a medium to be tempered is passed through the tempering device, wherein the second sensors comprise at least one or more temperature sensors for determining an engine temperature, a cooling water drainage and/or cooling water feed temperature, one or more sensors for measuring a temperature on a heated surface (film temperature), one or more pressure sensors for determining a fill pressure, a cooling water differential pressure and/or for a differential pressure on the mud guard of the tempering device. The number and local disposition of the second sensors significantly increases the measurement density in the tempering device and thus makes it easier to locate the error. The diagnosis procedure can use the specific data measured by the second sensors or a combination of the data for error localization.

A motor temperature sensor measures the motor temperature of the pump. This is measured and compared with a threshold value. If the value is exceeded, an alarm is triggered. The cause can be a defect on the motor, or also a too high ambient temperature, or an inadequate air feed to the pump motor, e.g. by positioning the appliances to close to each other.

The temperature sensor cooling water inflow measures the cooling water feed temperature. The value can fluctuate during the course of time as a result of a fluctuating temperature, depending on the outside temperature during the course of the year. By observing these values and setting threshold values, it is possible to react in due time to an insufficient cooling water temperature.

The temperature sensor for the cooling water discharge measures the cooling water drainage temperature. With the aid of the temperature value for the cooling water inflow, a differential temperature between inflow and discharge can be measured. When the tempering device is in cooling mode, the cooling water discharge temperature must be higher than the inflow temperature. If the discharge is not increased, this indicates that a cooling water valve does not open. A too strong increase indicates insufficient cooling water flow and thus a contamination of the heat exchanger.

The measurement of the temperature on the heated surface (film temperature) of the electric heating makes it possible to create a temperature difference between the heating surface and the flow temperature of the heating medium. If a temperature difference is too large, this is an indication of a coating on the heated surface, such as calcification, which must be removed.

A pressure sensor for determining a fill pressure measures the filling pressure. If the value is too low, the filling pressure for compressed water appliances (here the tempering device) may be too low. Compressed water appliances have an internal pressure compensation in order to keep the water in the system fluid. If the system pressure is higher than the filling pressure, the filling process no longer works. Here, the operator can be informed that the pressure is too low. The entire lack of pressure indicates a faulty connection (lack of supply). Additionally, the filling pressure must decrease when the valve is opened, particularly at low temperatures. This is due to the fact that the container pressure is either zero or very low. If no pressure drop can be determined, this indicates that a filling valve has become stuck.

The cooling water differential pressure sensor measures the cooling water differential pressure. The cooling capacity of a tempering device depends substantially on the pressure difference between the cooling water inflow and the cooling water discharge. The value can fluctuate during the course of time by connecting additional consumers to a cooling water supply. If the value is too low when switched off, the pressure difference may be too low and the system does not provide the necessary cooling capacity. Here, the operator can be informed that the pressure is too low. The entire lack of pressure indicates a faulty connection (lack of supply). Additionally, the filling pressure must decrease when the valve is opened. This is caused by the fact that as a result of opening, a connection between the inflow and discharge is created, and the cooling water therefore flows. In this way, a portion of the pressure into the supply lines and the mud guard drops, i.e. the pressure difference to be measured is lower. If no pressure difference can be detected during opening, this indicates that a valve has become stuck. If, however, the pressure drop is very high, the pressure drops in the supply and in the mud guard are relatively high, accordingly these facilities should be checked.

All these sensor functions may only be provided by the second sensors. The first sensors, which are otherwise the only ones present, for securing the operation of the system with the tempering device, are not able to produce the above measurement results and can therefore also not contribute to the error identification as described above.

In another example, prior to execution of the diagnosis procedure, the tempering device is cooled and/or emptied. Through cooling and emptying, the tempering device is brought into a defined state, as a result of which the diagnosis procedure can then be conducted with defined, known framework conditions. The exclusion of undefined initial conditions increases the reliability of the results of the diagnosis procedure. Preferably, cooling is here conducted down to room temperature, in order to create a temperature balance with the surrounding environment.

In a further example, a first part of the diagnosis procedure is conducted in an emptied state of the tempering device. As a result, the potential errors to be detected are separated into potential errors that only occur in the filled state and those that occur independently of filling. For this reason, a number of possible errors can already be checked before filling, and identified or excluded if necessary, which simplifies the diagnosis process in the filled state.

In a further example, a medium to be tempered is passed through the tempering device, wherein the first part comprises one or more measurements or settings of parameters from a group of parameters comprising temperature, signal throughput to second and/or first sensors, switch positions of switches and valves, cooling water differential pressure, filling pressure, system pressure before filling and/or unwanted starting filling process in the tempering device. As a result of the measurement of this data, the conclusions already described above can be made, wherein the diagnosis procedure in the emptied state enables the separation of error sources for improved localization of errors.

In a further example, a second part of the diagnosis procedure is conducted in a filled state of the tempering device. Here, the functions already tested in the emptied state can be assumed to be error-free, so that the error search is simplified for the second part of the diagnosis procedure. The further diagnosis procedure in the filled state and the related separation of error sources in the filled and empty state makes it easier to localize errors.

In a further example, the second part of the diagnosis procedure includes at least one or more of filling of the tempering device with a medium, preferably water or oil; checking a cooling circuit of the tempering device; checking a heating capacity of the tempering device; checking a tightness of the tempering device; checking a cooling capacity of the tempering device; and checking a pump capacity of the tempering device.

The above step-wise check of potential error sources is a very effective method for identification and localization of error sources. The above test steps can here be conducted in the above sequence or in another suitable sequence.

In a further example, the second part includes one or more measurements or settings of parameters from a group of parameters comprising temperature, switch positions of switches and valves, filling pressure, system pressure during or after filling, filling duration, pump status, actuation of water change, capacity and dT regulation, flow, heating capacity, cooling capacity in the tempering device. As a result of the measurement of this data, the conclusions already described above can be made, wherein the diagnosis procedure in the emptied state enables the separation of error sources for improved localization of errors.

In a further example, the connecting of the tempering device to the defined consumer is conducted by connecting the outlet and the inlet into the tempering device by means of a hose that short circuits the outlet and the inlet. This defined consumer is easy to mount, requires the smallest number of parts for mounting and constitutes the lowest additional error source during the diagnosis procedure.

In a further example, all dirt filters of the tempering device are cleaned before connecting the tempering device to the defined consumer. As a result, a blocked filter is excluded as an error and the initial state is additionally defined for the diagnosis procedure. Possibly, the error can already be thus identified when the diagnosis procedure runs inconspicuous after cleaning.

In a further example, the tempering device automatically starts the diagnosis procedure after connection of the defined consumer. As a result, handling is simplified during the diagnosis procedure In a further example, the diagnosis method comprises the further steps of rectifying the identified and localized error and installing the tempering device into the system. The system is then ready for operation again.

In another aspect, a tempering device for tempering of systems, includes one or more first sensors and one or more further components that are provided to ensure the operation of the system with the tempering device, one or more second sensors provided for the measurement of the state of the tempering device and/or the ambient conditions around the tempering device, and a diagnosis unit.

In an example, a diagnosis program is already installed on the diagnosis unit or is uploaded into the diagnosis unit by means of an external data carrier (memory stick, CR-ROM etc.) via a corresponding interface in the tempering device, such as a USB interface. Alternatively, the tempering device can comprise a WiFi interface or an internet connection, via which the diagnosis program is uploaded onto the diagnosis unit or can be implemented as a web application via the diagnosis unit.

The tempering device may make it possible to also maintain appliance availability for the tempering devices at the customer also for areas where service technicians are not immediately available, without having to keep a pool of replacement appliances in storage.

With the tempering device on the diagnosis unit, a diagnosis program may be installed ready to run for executing the diagnosis method, wherein the tempering device is designed such that the diagnosis program can access and check at least the first sensors and if necessary the additional components in a predetermined sequence stored in the diagnosis program, until the error has been identified and/or localized in the tempering device. Due to the diagnosis program installed ready to run on the diagnosis unit, it is ensured that the diagnosis procedure can be conducted at all times by means of the diagnosis program, without taking external conditions into account, such as availability of an internet connection, availability of a data carrier and of the diagnosis program suitable for the respective tempering device. Due to the installation of the diagnosis program onto the individual tempering device, it is further ensured that the diagnosis program is optimized to the respective tempering device and that it can be directly executed without further action required by the user (uploading, installing, etc.), which simplifies the error identification and does not require particular user skills (which program is suited to which tempering device, etc.). In one embodiment, the diagnosis facility and thus the diagnosis program can also access the first sensors. The first and second sensors and the additional components of the tempering device are connected to the diagnosis unit in a suitable manner. For example, the control unit of the tempering device can comprise the diagnosis unit.

In a further example, the tempering device may include a media inlet and a media outlet, in order to enable a medium to be tempered to pass through. The connection of the tempering device to a media supply makes it possible to connect a defined consumer in an uncomplicated manner for the diagnosis procedure in order to simplify the error search. Media to be tempered can be e.g. water or oils.

In a further example, the second sensors may include at least one or more temperature sensors for determining an engine temperature, a cooling water drainage and/or cooling water feed temperature, one or more sensors for measuring a temperature on a heated surface, one or more pressure sensors for determining a fill pressure, a cooling water differential pressure and/or for a differential pressure on the mud guard of the tempering device.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of describing the present disclosure and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the present disclosure or the appended claims. Further, it should be understood that any one of the features can be used separately or in combination with other features. Other systems, methods, features, and advantages of the present disclosure will be or become apparent to those skilled in the art upon examination of the description. It is intended that all such additional systems, methods, features, and advantages be included within this description, be within the scope of the present disclosure, and be protected by the accompanying claims.

Figure 1:
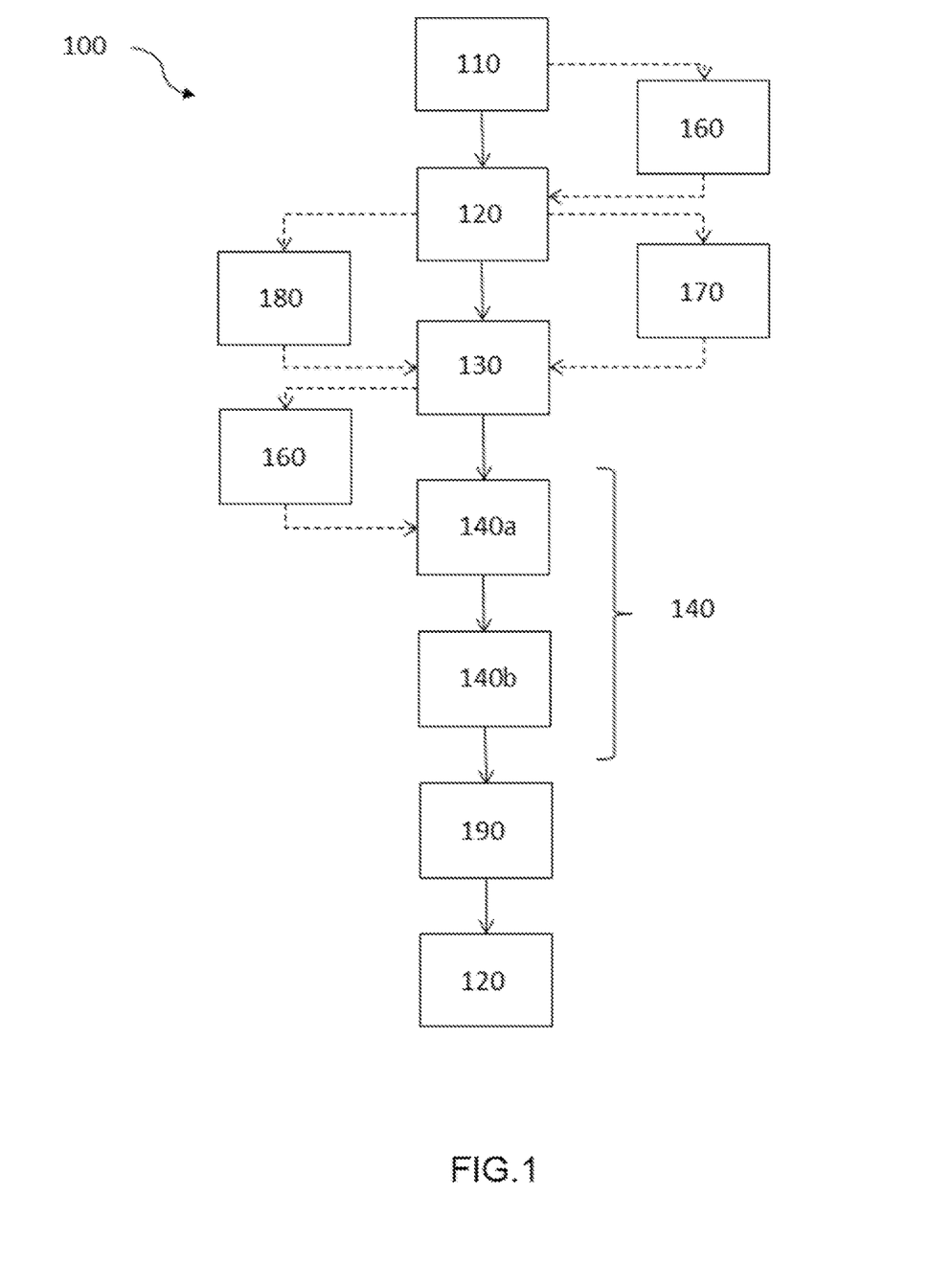
FIG. 1 illustrates an example of a diagnosis method

FIG. 1 shows an embodiment of the diagnosis method 100 for tempering devices 10 for identification and/or localization of errors in the tempering device. Here, the tempering device 10 is equipped with one or more first sensors 1 and one or more further components 3, which are provided for securing the operation of the system 20 with the tempering device 10, and with one or more second sensors 2 that are provided for measuring the state of the tempering device 10 and/or the ambient conditions around the tempering device 10, and a medium to be tempered is passed through it. Here, the tempering device 10 is not necessarily an integral component of the system 20 to be tempered, but stands separate from the system 20 and is connected to the system 20 via hydraulic connections (hoses, tubes). Here, the diagnosis method 100 comprises the following steps of determining 110 of the tempering device 10 to be checked with a diagnosis procedure. The tempering device can be determined on the basis of whether it shows faulty behavior or whether an inspection is due for it as a result of an upcoming maintenance interval. The tempering device 10 is then decoupled 120 from the system 20, following by a connection 130 of the tempering device 10 to a defined consumer 30, which is conducted for example by connecting the outlet and inlet of the tempering device by means of a hose that short circuits the outlet and the inlet, wherein prior to connection 130 of the tempering device 10 to the defined consumer 30, cleaning 180 can be conducted for all dirt filters of the tempering device 10. Here, prior to conducting the diagnosis procedure 140, the tempering device 10 can be cooled 160 and/or emptied 170; preferably, cooling 160 is conducted down to room temperature. The cooling 160 can however also be conducted directly after step 110, so that no hot medium needs to be handled in the subsequent steps. Then, the diagnosis procedure is executed 140 for the tempering device 10 by means of a diagnosis program 5, which can be automatically started by the tempering device 10 following connection of the defined consumer 30, wherein the diagnosis program 5 checks the components 3 and the first and second sensors 1, 2 of the tempering device 10 in a pre-determined sequence stored in the diagnosis program 5, until the error or errors in the tempering device 10 are identified and/or localized. For doing so, the second sensors 2 comprise at least one or more temperature sensors for determining an engine temperature, a cooling water drainage and/or cooling water feed temperature, one or more sensors for measuring a temperature on a heated surface, one or more pressure sensors for determining a fill pressure, a cooling water differential pressure and/or for a differential pressure on the mud guard of the tempering device 10. Here, the diagnosis method 100 can comprise a first part 140a, which is conducted in an emptied state of the tempering device 10, wherein the first part 140a comprises one or more measurements or settings of parameters from a group of parameters comprising temperature, signal throughput to second and/or first sensors 1,2, switch positions of switches and valves, cooling water differential pressure, filling pressure, system pressure before filling and/or undesired starting filling process in the tempering device 10. The diagnosis method can further comprise a second part 140b, which is conducted in the filled state of the tempering device 10, wherein the second part 140b comprises one or more measurements or settings of parameters from a group of parameters comprising temperature, switch positions of switches and valves, filling pressure, system pressure during or after filling, filling duration, pump status, triggering of water change, capacity and dT regulation, flow, heating capacity, cooling capacity in the tempering device 10. The diagnosis program issues corresponding information to the user for error rectification during the diagnosis procedure 140 when errors are detected. Following identification and localization of the error(s), these can be rectified 190 and the tempering device 10 can again be installed 200 in the system 20.

Figure 2:
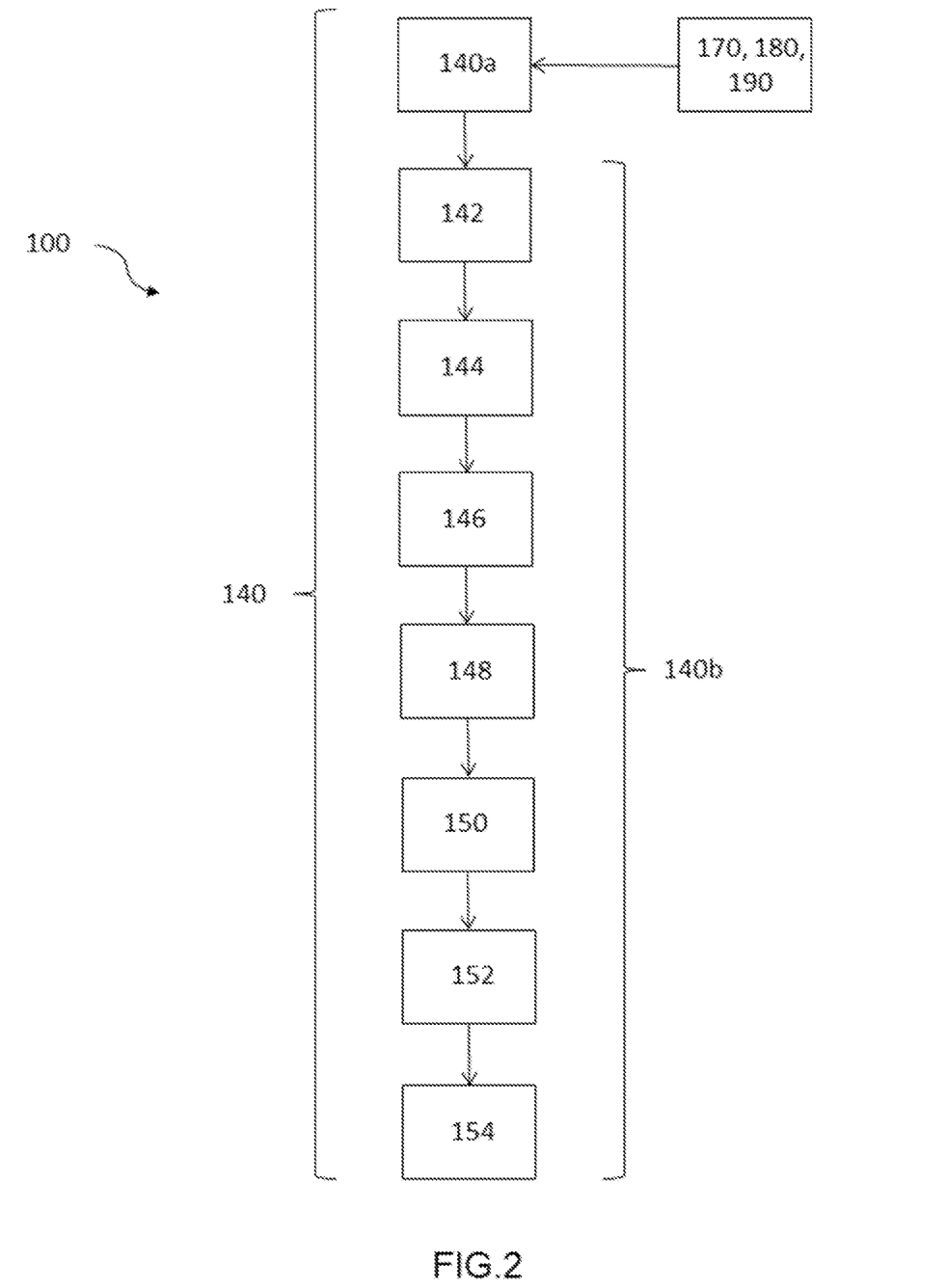
FIG. 2 illustrates an example of the diagnosis procedure of the diagnosis method.

FIG. 2 shows an embodiment of the diagnosis procedure 140 of the diagnosis method 100, comprising the following steps of filling 142 the tempering device 10 with a medium, preferably water or oil, wherein during filling, the tightness and the applied pressures can be measured, the corresponding switches (such as floating switches) can be tested and evaluated, followed by the checking and/or calibration 144 at least of the second sensors 2 for correct functioning, so that a measurement of the measurement values 146, 148, 150, 152 can at least be conducted with the second sensors in order to evaluate a state of the components 3 of the tempering device 10 to a high degree of reliability. Additionally, the cooling circuit 3 of the tempering device 10 is then checked 146 by opening the cooling water valve, measuring the pressure drop and measuring the differential pressure when the valve is open. If the pressure drop is high, the supply line and/or mud guard can be blocked. If the pressure drop cannot be measured, the valves might not open or might be otherwise defective, so that cleaning or replacement should be conducted. The inspection thus comprises a check of the valve function of all valves involved. If the pressure drop is low, the heat exchanger on the cooling water side may be dirty. The heating capacity of the tempering device 10 is checked 148 with the heating switched on. If the temperature increase is too low, the heating rod may be dirty or defective. Here, the tightness of the system and the functioning of the valves and switches can also be checked 150. Checking 152 the cooling capacity of the tempering device 10 is conducted over time, wherein inadequate cooling down can indicate a dirty heat exchanger. The checking 154 of a pump capacity of the tempering device 10 is conducted over time, wherein an inadequate pump capacity can indicate dirty feed and discharge lines or a defective pump. The above steps can also be conducted with the aid of the first sensors 1. Following successful execution of the diagnosis procedure, the tempering device is again emptied, the defined consumer is decoupled and the tempering device is rinsed again, if necessary. If it is functioning correctly again, it can then be re-installed into the system 20.

Figure 3:
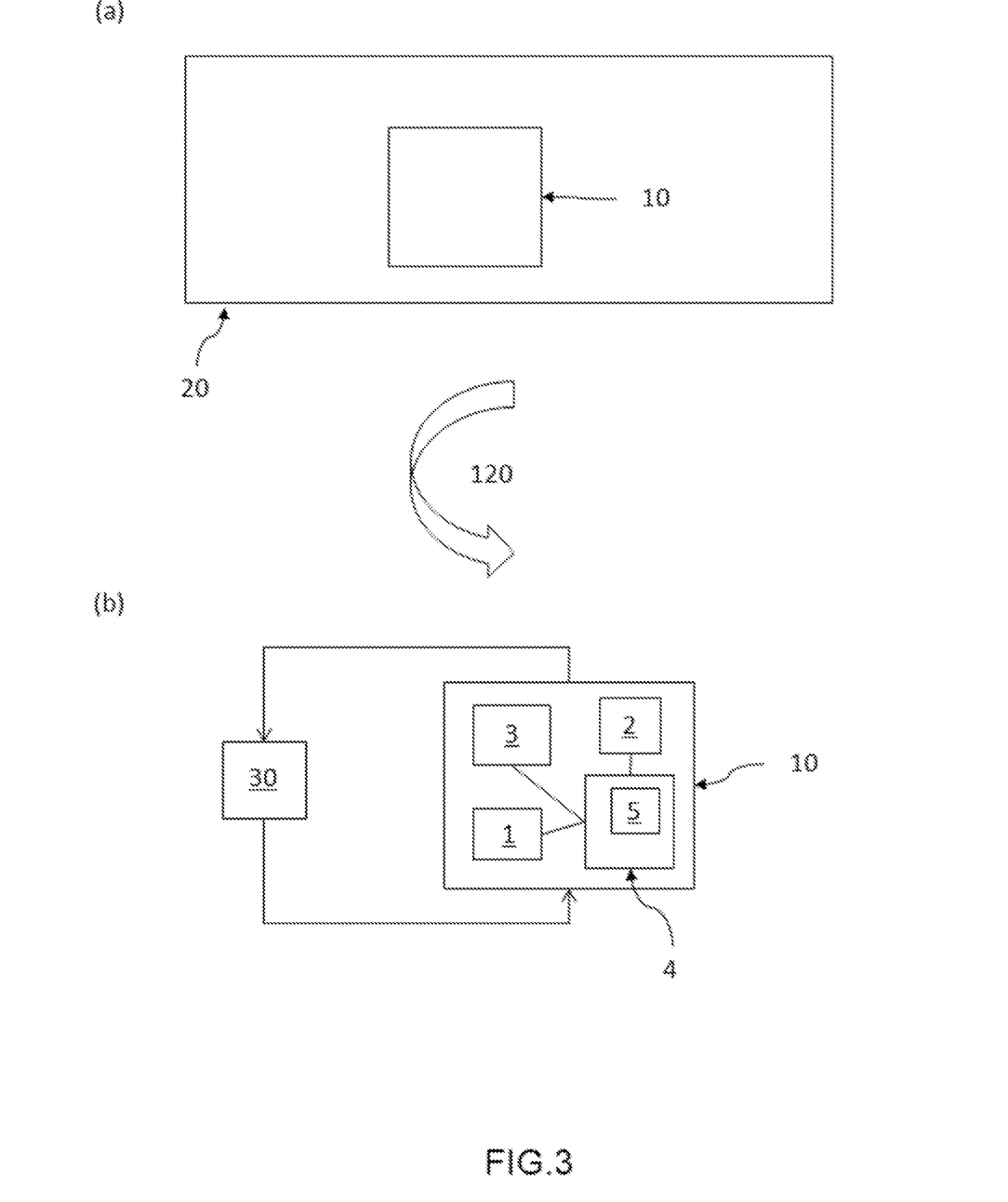
FIG. 3 illustrates a schematic view of an example of the tempering device (a) installed in a system, and (b) decoupled from the system in order to conduct the diagnosis procedure.

FIG. 3 shows a schematic view of an embodiment of the tempering device 10 (a) installed in a system 10, and (b) decoupled from the system 20 in order to conduct the diagnosis procedure 140. In FIG. 3, the tempering device 10 is still installed in the system 20 or is connected to the system 20. In order to conduct the diagnosis method 100, the relevant tempering device 10 is decoupled 120 from the system. The tempering device 10 shown in FIG. 3 here comprises one or more first sensors 1 and one or more additional components 3, which are provided to ensure the operation of the system 20 with the tempering device 10, one or more second sensors 2, which are provided to measure the state of the tempering device 10 and/or the ambient conditions around the tempering device 10, and a diagnosis unit 4, equipped to conduct a diagnosis method 100 according to any of the above claims, for identification and/or localization of errors in the tempering device 10. On the diagnosis unit 4, a diagnosis program 5 is here installed ready to run for execution of the diagnosis method 100, wherein the tempering device is designed such that the diagnosis program 5 can access and check the first and second sensors 1, 2 and the additional components 3 in a predetermined sequence stored in the diagnosis program 5, until the error has been identified and/or localized in the tempering device 10. For this purpose, the first and second sensors and the additional components 3 are suitably connected to at least the diagnosis unit 4. The tempering device is controlled by a control unit during ongoing operation. This control unit can also comprise the diagnosis unit 4. Here, the second sensors 2 comprise at least one or more temperature sensors for determining an engine temperature, a cooling water drainage and/or cooling water feed temperature, one or more sensors for measuring a temperature on a heated surface, one or more pressure sensors for determining a fill pressure, a cooling water differential pressure and/or for a differential pressure on the mud guard of the tempering device 10. The tempering device further comprises a media inlet and a media outlet, in order to enable a medium to be tempered to pass through.

The features of the invention disclosed in the above description, in the drawings and in the claims can be essential both individually and in any combination required for the realization of the invention in its different embodiments.

LIST OF REFERENCE NUMERALS

1 First sensors of the tempering device
2 Second sensors of the tempering device
3 Components of the tempering device
4 Diagnosis unit
5 Diagnosis program
10 Tempering device
20 System with tempering device(s)
30 Defined consumer
100 Diagnosis method for identification/localization of errors in the tempering device
110 Determining the tempering device to be checked in the system
120 Decoupling the tempering device from the system
130 Connecting the tempering device to a defined consumer
140 Conducting a diagnosis procedure for the tempering device
140a First part of the diagnosis procedure
140b Second part of the diagnosis procedure
142 Filling of the tempering device with a medium
144 Checking and/or calibrating at least the second sensors, if necessary also the first sensors
146 Checking a cooling circuit of the tempering device
148 Checking a heating capacity of the tempering device
150 Checking a tightness of the tempering device
152 Checking a cooling capacity of the tempering device
154 Checking a pump capacity of the tempering device
160 Cooling down the decoupled tempering device
170 Emptying the decoupled tempering device
180 Cleaning of all dirt filters of the tempering device
190 Rectifying the identified and localized errors for the tempering device
200 Installing the tempering device in the system

What is claimed is:

1. A diagnosis method for identification or localization of errors in tempering devices for tempering of systems, comprising providing tempering devices each comprising one or more first sensors and one or more components for securing an operation of the systems with the tempering device, and one or more second sensors for measuring a state of the tempering device or ambient conditions around the tempering device;
determining the tempering device to be checked with a diagnosis procedure;
decoupling the tempering device from the system;
connecting the tempering device to a defined consumer; and
conducting the diagnosis procedure for the tempering device by using a diagnosis program,
wherein the diagnosis program checks the components and the first and second sensors of the tempering device in a pre-determined sequence stored in the diagnosis program until the error in the tempering device is identified or localized.

2. The diagnosis method of claim 1, wherein the conducting of the diagnosis procedure comprises at least one of checking and calibrating the one or more second sensors for correct functioning.

3. The diagnosis method of claim 2, further comprising measuring values with the one or more second sensors in order to assess a state of the components of the tempering device after the at least one of checking and calibrating is completed successfully.

4. The diagnosis method of claim 2, further comprising measuring values with the one or more first sensors in order to assess a state of the components of the tempering device after the at least one of checking and calibrating is completed successfully.

5. The diagnosis method of claim 1, further comprising passing a medium to be tempered through the tempering device,
wherein the one or more second sensors comprise at least one or more temperature sensors for determining an engine temperature, a cooling water drainage or cooling water feed temperature, one or more sensors for measuring a temperature on a heated surface, one or more pressure sensors for determining a fill pressure, a cooling water differential pressure, or a differential pressure sensor on a mud guard of the tempering device.

6. The diagnosis method of claim 1, further comprising cooling down or emptying the tempering device prior to execution of the diagnosis procedure.

7. The diagnosis method of claim 6, wherein a first part of the diagnosis procedure is conducted in an emptied state of the tempering device.

8. The diagnosis method of claim 7, further comprising passing a medium to be tempered through the tempering device,
wherein the first part of the diagnosis procedure comprises setting or measure parameters comprising one or more of temperature, signal throughput to the one or more second sensors or one or more first sensors, switch positions of switches and valves, cooling water differential pressure, filling pressure, and system pressure before filling or undesired starting of the filling process in the tempering device.

9. The diagnosis method of claim 7, wherein a second part of the diagnosis procedure is conducted in a filled state of the tempering device.

10. The diagnosis method of claim 9, wherein the second part of the diagnosis procedure comprises at least one of:
filling of the tempering device with a medium, water, or oil;
checking a cooling circuit of the tempering device;
checking a heating capacity of the tempering device;
checking a tightness of the tempering device;
checking a cooling capacity of the tempering device; and
checking a pumping capacity of the tempering device.

11. The diagnosis method of claim 9, wherein the second part of the diagnosis procedure comprises setting or measure parameters comprising one or more of temperature, switch positions of switches and valves, filling pressure, system pressure during or after filling, filling duration, pump status, actuation of water change, capacity and dT-regulation, flow, heating capacity, and cooling capacity in the tempering device.

12. The diagnosis method of claim 1, wherein the connecting of the tempering device to the defined consumer is conducted by connecting an outlet and an inlet into the tempering device using a hose that short-circuits the outlet and the inlet.

13. The diagnosis method of claim 1, wherein, before connecting the tempering device to the defined consumer, a cleaning of all dirt filters of the tempering device is conducted.

14. The diagnosis method of claim 1, wherein the tempering device automatically starts the diagnosis procedure after connection of the defined consumer.

15. The diagnosis method of claim 1, further comprising rectifying the identified or localized errors and installing the tempering device into the system.

16. A tempering device for tempering of systems, comprising
one or more first sensors and one or more components for ensuring operation of the system with the tempering device;
one or more second sensors for measuring a state of the tempering device or ambient conditions around the tempering device; and
a diagnosis unit on which a diagnosis program is installed ready for executing a diagnosis method according to claim 1, wherein the diagnosis program can access and check the one or more first and second sensors and the one or more components in a predetermined sequence stored in the diagnosis program until the error has been identified or localized in the tempering device.

17. The tempering device of claim 16, wherein the tempering device comprises a media inlet and a media outlet so that a medium to be tempered can pass through.

18. The tempering device of claim 16, wherein the one or more second sensors comprise at least one or more temperature sensors for determining an engine temperature, a cooling water drainage or cooling water feed temperature, one or more sensors for measuring a temperature on a heated surface, one or more pressure sensors for determining a fill pressure, a cooling water differential pressure, or a differential pressure sensor on the mud guard of the tempering device.

* * * * *